(12) United States Patent
Cavallaro et al.

(10) Patent No.: US 12,328,338 B2
(45) Date of Patent: Jun. 10, 2025

(54) METHODS AND SOFTWARE FOR TRAINING USERS TO DISCERN ELECTRONIC PHISHING MESSAGES AND FOR BUILDING PHISHING KNOWLEDGEBASES FOR AUTOMATED ELECTRONIC-MESSAGE FILTERING

(71) Applicant: Trustees of Dartmouth College, Hanover, NH (US)

(72) Inventors: Samuel Cavallaro, New London, NH (US); Catherine Porter, Hartford, VT (US); Samuel Fielder, North Pomfret, VT (US); Mitch Davis, Cornish, NH (US); William Cowen, Quechee, VT (US)

(73) Assignee: Trustees of Dartmouth College, Hanover, NH (US)

( * ) Notice: Subject to any disclaimer, the term of this patent is extended or adjusted under 35 U.S.C. 154(b) by 159 days.

(21) Appl. No.: 17/941,833

(22) Filed: Sep. 9, 2022

(65) Prior Publication Data

US 2023/0073905 A1    Mar. 9, 2023

Related U.S. Application Data

(60) Provisional application No. 63/242,258, filed on Sep. 9, 2021.

(51) Int. Cl.
*H04L 29/06* (2006.01)
*G09B 5/06* (2006.01)
*H04L 9/40* (2022.01)

(52) U.S. Cl.
CPC .......... *H04L 63/1483* (2013.01); *G09B 5/065* (2013.01)

(58) Field of Classification Search
CPC .......................... H04L 63/1483; G09B 5/065
See application file for complete search history.

(56) References Cited

U.S. PATENT DOCUMENTS

| 2020/0053120 | A1* | 2/2020 | Wilcox | H04L 63/1491 |
| 2021/0248222 | A1* | 8/2021 | Rosenblatt | G06F 21/35 |
| 2022/0070216 | A1* | 3/2022 | Kohavi | H04L 63/1416 |

* cited by examiner

*Primary Examiner* — Evans Desrosiers
(74) *Attorney, Agent, or Firm* — Downs Rachlin Martin PLLC

(57) ABSTRACT

Computer-executed methods for training users to discern electronic phishing messages to reduce risk of threats to the integrity of computing systems and/or computing resources. In some embodiments, the methods involve gamifying the training to motivate users to participate in the training. In some embodiments, gamification includes instructing electronic-messaging-system users to forward suspected phishing messages for analysis. The analysis may include automatically determining one or more of a variety of factors for each forwarded suspected phishing message, such as whether or not the suspected phishing message is an actual phishing message, whether or not the reporting is an original reporting, and how quickly the user made the report. In some embodiments, points are awarded based on the analyzed factors. In some embodiments, the methods involve building phishing knowledgebases for automatic electronic-message filtering. Software for performing disclosed methods or one or more portions thereof.

20 Claims, 6 Drawing Sheets

METHODS AND SOFTWARE FOR TRAINING USERS TO DISCERN ELECTRONIC PHISHING MESSAGES AND FOR BUILDING PHISHING KNOWLEDGEBASES FOR AUTOMATED ELECTRONIC-MESSAGE FILTERING

RELATED APPLICATION DATA

This application claims priority to U.S. Provisional Patent Application Ser. No. 63/242,258, filed on Sep. 9, 2021, and titled "METHODS AND SOFTWARE FOR TRAINING USERS TO DISCERN ELECTRONIC PHISHING MESSAGES AND FOR BUILDING PHISHING KNOWLEDGEBASES FOR AUTOMATED ELECTRONIC-MESSAGE FILTERING", which is incorporated herein by reference in its entirety.

FIELD OF THE INVENTION

The present invention generally relates to the field of electronic messaging security. In particular, the present invention is directed to methods and software for training users to discern electronic phishing messages and for building phishing knowledgebases for automated electronic-message filtering.

BACKGROUND

As is well-known, phishing is a social-engineering technique that has developed with the increasing prevalence of Internet-based communications, such as email, texting, direct-messaging, etc. Phishing occurs when an attacker sends a fraudulent message, such as an email message, designed to trick a recipient into taking an action that can result in a bad consequence to the user and/or another, such as an organization that employs the user or with which the user is otherwise affiliated. Examples of actions that a phishing message may attempt to elicit include revealing personal, proprietary, or other sensitive information and/or the selecting of a link embedded in the message that results in deployment of malicious software to the computer infrastructure hosting the target's email account.

Email phishing has become so pervasive that organizations, such as businesses, universities, governmental agencies, and many others, attempt to train their members to discern phishing email messages so that they can distinguish them from non-phishing email messages. The position is that the more knowledge email users have of phishing scams and phishing email messages, the more likely they will be able to spot phishing email messages and know to not take any action other than deleting the phishing message and reporting it to the proper authority, such as their information technology (IT) administrator. Indeed, organizations are implementing a variety of phishing training programs to train their members to handle phishing email messages safely. For example, there are video-based programs that require users to watch one or more videos describing various techniques that attackers use in phishing email messages and then take quizzes to test the users' retention of the information in the video(s) and/or ability to apply what they learned from the video(s).

As another example of phishing training programs, some organizations create simulated phishing email messages and send these messages to users' email inboxes to see how the users handle them. The users do not know that these email messages are, in fact, simulated phishing attempts; rather they look just like actual phishing email messages and include one or more deceptive features, such as insincere solicitations of sensitive information and deceptively named hyperlinks, among others, and among other telltale indicia of actual phishing messages, such as mismatches between a sender's name and the sender's email address, misspellings, poor grammar, and certain subject matter and catch phrases, among other things. Consequently, the users are free to take any action they choose, hopefully informed by knowledge of phishing scams, but many times not so informed. Such actions include responding to the message without knowing that it is a phishing email message, selecting a hyperlink embedded in the message without knowing that it is a phishing email message, deleting the message suspecting or knowing that it is a phishing email message, and forwarding the message to a designated mailbox, among others, and any logical combination thereof.

Because these phishing email messages are simulated messages with organization-controlled parameters (e.g., sending email addresses and hyperlinked locations), the organization tracks how the users handle these messages, whether they respond to them, select hyperlinks embedded within them, forward them to the designated mailbox, or simply delete them. The organization then uses this tracking information to inform the users, typically in a negative way, about their behavior concerning phishing email messages in attempt to increase their knowledge of phishing techniques and scams.

Conventional phishing training programs, such as the video-based training program mentioned above, to the extent that users are aware of them, are typically the proverbial "just one more thing that they have to do" on top of an already-full schedule. Consequently, users have little motivation to give them their full attention. Consequently, the amount of useful information about phishing attempts that they actually retain after taking the quizzes is often suboptimal.

SUMMARY OF THE DISCLOSURE

In one implementation, the present disclosure is directed to a method of identifying and reporting original reports of electronic phishing messages reported by a plurality of users each having a corresponding electronic-message inbox, wherein each electronic-message inbox stores metadata for each message that the user inbox receives, the method being performed automatically by a computing system. The method includes receiving suspected phishing electronic messages forwarded by the users from the corresponding electronic-message inboxes; for each of the suspected phishing electronic messages: electronically collecting phishing-analysis data from the suspected phishing electronic message; executing a phishing-analysis computer algorithm that operates on the phishing-analysis data and on an electronic phishing knowledgebase to determine whether or not the suspected phishing electronic message is an electronic phishing message; electronically collecting message-identifying data from the suspected phishing electronic message for uniquely identifying the suspected phishing electronic message; using the message-identifying data, electronically retrieving metadata for the suspected phishing electronic message from the electronic-message inbox of the user that forwarded the suspected phishing electronic message; executing a reporting-analysis computer algorithm that operates on the message-identifying data and the metadata to determine whether or not the forwarding of the suspected phishing electronic message; and when the phishing-analysis computer algorithm determines that the suspected phishing electronic message is an electronic phishing message and the reporting-analysis computer algorithm determines that the reporting of the suspected phishing electronic message is an original reporting, electronically reporting the suspected phishing electronic message to a phishing agent as an original reporting.

In another implementation, the present disclosure is directed to a computer-readable storage medium containing machine-executable instructions for performing a method of identifying and reporting original reports of electronic phishing messages reported by a plurality of users each having a corresponding electronic-message inbox, wherein each electronic-message inbox stores metadata for each message that the user inbox receives. The method includes receiving suspected phishing electronic messages forwarded by the users from the corresponding electronic-message inboxes; for each of the suspected phishing electronic messages: electronically collecting phishing-analysis data from the suspected phishing electronic message; executing a phishing-analysis computer algorithm that operates on the phishing-analysis data and on an electronic phishing knowledgebase to determine whether or not the suspected phishing electronic message is an electronic phishing message; electronically collecting message-identifying data from the suspected phishing electronic message for uniquely identifying the suspected phishing electronic message; using the message-identifying data, electronically retrieving metadata for the suspected phishing electronic message from the electronic-message inbox of the user that forwarded the suspected phishing electronic message; executing a reporting-analysis computer algorithm that operates on the message-identifying data and the metadata to determine whether or not the forwarding of the suspected phishing electronic message; and when the phishing-analysis computer algorithm determines that the suspected phishing electronic message is an electronic phishing message and the reporting-analysis computer algorithm determines that the reporting of the suspected phishing electronic message is an original reporting, electronically reporting the suspected phishing electronic message to a phishing agent as an original reporting.

BRIEF DESCRIPTION OF THE DRAWINGS

For the purpose of illustrating the subject matter, the drawings show aspects of one or more embodiments of the disclosed subject matter. However, it should be understood that the present disclosure is not limited to the precise arrangements and instrumentalities shown in the drawings, wherein.

DETAILED DESCRIPTION

Figure 1:
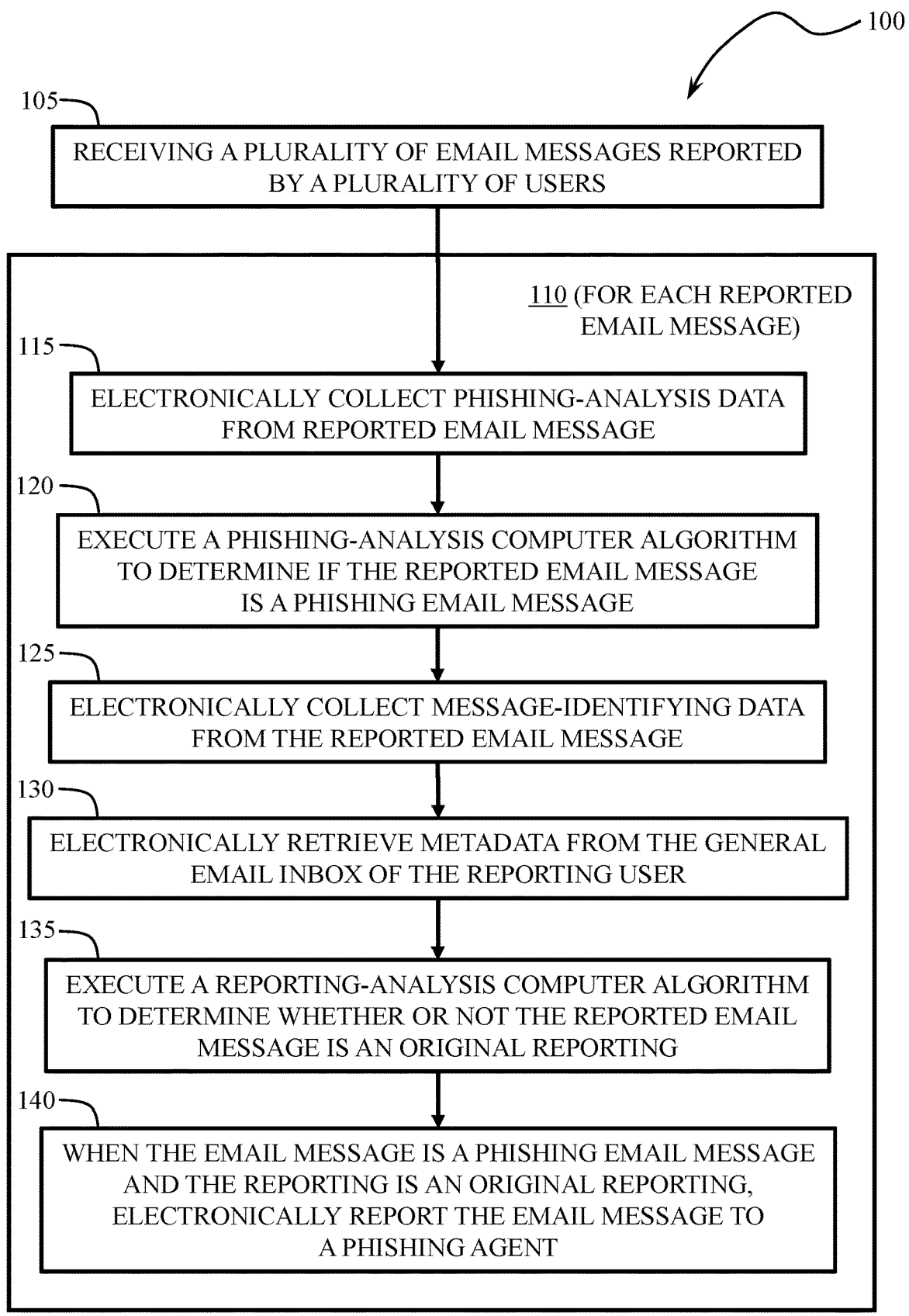
FIG. 1 is a flow diagram illustrating an example method of automatically identifying and reporting original reportings of phishing email messages.

In some aspects, the present disclosure is directed to methods of identifying and reporting original reports of electronic phishing messages, such as phishing email messages, from multiple users of an electronic messaging system, such as an email system of an organization of any of a wide variety of types, including educational institutions, public and private businesses, religious institutions, governmental agencies, and Internet service providers, among many others. Fundamentally, there is no limitation on the type of organization that can implement identifying and reporting methods of the present disclosure. In addition, while phishing email messages and email systems are focuses of examples disclosed herein, those skilled in the art will readily appreciate that methods, systems, and features disclosed herein may be applied to other electronic messages and messaging systems, such as texts and texting systems and direct-messages and direct-messaging systems.

As those skilled in the art will readily appreciate, identifying-and-reporting methods of the present disclosure for electronic phishing messages can not only lead to increased participation by messaging-system users in properly identifying and reporting actual phishing messages to the proper authority (e.g., an organization's security analyst or other information technology (IT) personnel), but also to increasing the messaging-system's users' knowledge of phishing scams beyond knowledge increases they would have otherwise had using conventional phishing-scam training schemes. These factors contribute to both increasing an organization's knowledgebase of phishing scams and decreasing the number of incidences of messaging-system users falling victim to phishing scams. Both of these results act to increase the overall security of an organization's messaging system(s) and other network systems. As noted in the Background section above, with phishing scams becoming more and more prevalent, the need for heightened awareness and increased vigilance relative to these scams is becoming increasingly important.

In some aspects, the present disclosure is directed to methods of training electronic-messaging-system users, such as email users of an organization that is any of the organizations mentioned above, among others, on identifying electronic phishing messages and phishing scams. In some embodiments, a training method of the present disclosure may be characterized as a competitive game that pits multiple messaging-system users against one another to compete, for example, for points and/or rewards. Competitive-game embodiments of training methods of the present disclosure provide advantages over typical conventional phishing training programs in that they incentivize learning and make learning fun rather than making training just another task for messaging-system users to complete during their already-busy schedules. In addition, in competitive-game embodiments, messaging-system users can be more meaningfully rewarded for reporting electronic phishing messages than simply receiving an electronic message from their organization's security authority thanking them for reporting an electric phishing message that they receive as is sometimes conventionally done.

In competitive-game embodiments, it can be beneficial to view various elements of these embodiments as forming an automated "transformation connector" between phishing scam security features of an electronic messaging system, including automated electronic phishing message detectors and phishing-analysis datastores on the one hand and a computer-based game on the other hand that provides a technical solution to assist an organization with improving the effectiveness of its phishing scam security features. At a high-level, a transformation connector of the present disclosure effectively transforms various data about electronic phishing messages to, for example, points and/or prizes for users (e.g., "players," "contestants," etc.) for use in the game. Depending upon implementation, the electronic phishing messages at issue may be actual electronic phishing messages sent by real scammers and/or simulated electronic phishing messages that are concocted using telltale indicia from actual electronic phishing messages but are otherwise innocuous. Examples of electronic phishing message data that may be transformed by a transformation connector, include, but are not limited to obviousness of telltale indicia, quickness of reporting, type of electronic phishing message (e.g., actual vs simulated), and severity of the real-world consequence of treating the electronic phishing message as a legitimate message, among others.

As those skilled in the art are acutely aware, the detection of electronic phishing messages, currently especially phishing email messages, has become a significant technology-based problem that organizations and third-party vendors are working hard to solve because of the importance to security. Unfortunately, most of the solutions involve only dedicated personnel to build and feed data to automated message scanning software and/or to deploy professional trainers and/or professionally produced training materials to train organization members on how to spot electronic phishing messages. In stark contrast, a transformation connector of the present disclosure can greatly improve an organization's IT security by allowing the organization to gamify its phishing-scam security features and, thereby, not only increase the participation of members of the organization at large (i.e., not just personnel dedicated to electronic-message, e.g., email, security) in spotting and reporting suspected electronic phishing messages (which also allows the organization to grow its phishing scam knowledgebase more quickly) but also simultaneously quickly increase the members' knowledge of telltale indicia of electronic-message phishing scams that reduces the number of victim within the organization. Gamification of electronic-message security, which can be perceived as a relatively dry topic to many members of an organization and otherwise be a chore to learn more about, leverages the human characteristics of competitiveness and desire to do things that are fun in ways to provide manifold increases in member-participation in phishing scam awareness and reporting, which, as noted above, greatly benefits the organization in turn.

With these and other aspects in mind, following are descriptions of some example embodiments that incorporate one or more of these aspects. Those skilled in the art will readily appreciate that the following example embodiments are not exclusive and that a variety of other embodiments that incorporate one or more aspects of the present disclosure are possible, including embodiments covered by the appended claims and embodiments not covered by the appended claims but are otherwise disclosed.

Before describing example embodiments, it is noted that the term "phishing email message" as used herein means any email message that is unsolicited by the recipient and was sent by the sender to deceive the recipient and induce them to taking at least one action having consequences that the recipient is unaware of. Examples of such actions include, but are not limited to, selecting a malicious link (hyperlink) embedded in the body of the phishing email message, replying to the phishing email message (e.g., to open a further email conversation), replying to the phishing email message and providing private information (e.g., private to the user or private to the user's organization, or both, among other information), forwarding the email message as directed in the phishing email message, and any sensical combination thereof, among others. More generally, the term "electronic phishing message" can be used to extend the specific instance of "phishing email messages" to other types of electronic messaging, such as text messaging and direct messaging, among others.

One skilled in the art will appreciate that electronic phishing messages typically contain one or more telltale indicia that the message is an electronic phishing message. Examples of such indicia include, but are not limited to, a sender address that does not match the name of the sender (e.g., "spoofed" email addresses), use of common message-subject lines, use of common message-body text, uniform resource locators (URLs) unrelated to the text and/or image of the hyperlink, poor grammar, and common and/or excessive misspellings, among others. As discussed below, telltale indicia of electronic-message phishing scams can be used in one or more ways in methods of the present disclosure, such as to automatically assist in confirming or at least in suspecting a particular suspected/known electronic phishing message, and/or to use to automatically build a phishing knowledgebase, among others.

In the context of this present disclosure, in some embodiments each electronic phishing message is only an actual electronic phishing message, i.e., an electronic phishing message sent by a bad actor for nefarious reasons. In some embodiments, each electronic phishing message is only a simulated electronic phishing message, i.e., an electronic phishing message created and sent, for example, by the organization at issue for the purpose of training users in phishing scams, but that otherwise contains one or more telltale indicia of a phishing scam. In some embodiments each electronic phishing message may be either of an actual electronic phishing message or a simulated electronic phishing message. In some examples, a simulated electronic phishing message may contain one, the other, both, or neither of the following: a sender address that is under the control of the organization at issue but unknown to the electronic-messaging-system users and a hyperlinked URL that links to an Internet location that is under the control of the organization at issue but is unknown to the electronic-messaging-system users. One skilled in the art will understand how to create simulated electronic phishing messages for use in methods of the present disclosure.

Turning now to examples, FIG. 1 illustrates an example method 100 of identifying and reporting original reports of phishing email messages reported by a plurality of users on an email system, such as an email system of an organization or other entity. As noted above, this and the following examples are directed to email systems. However, those skilled in the art will readily understand how to apply similar methodologies to other types of electronic-messaging systems, such as text-messaging systems and direct-messaging systems, among other. Consequently, email-specific terminology used in the method 100 and other methods and systems disclosed herein can be replaced by terminology relevant to the type of electronic-messaging system at issue, such as terminology used in text-specific technology (e.g., SMS, MMS) and terminology used in direct-messaging-technology. For example, the term "phishing email message" may be replaced by "phishing text message" or "phishing direct message" or, more generically, "electronic phishing message", among others. Similarly, other email-specific terminology and/or technical features can be replaced by analogous terminology and technical features pertinent to the electronic-messaging technology at issue, as those skilled in the art will readily appreciate.

In the example of FIG. 1, each user, i.e., email user, may serve in any capacity within the organization or have any other affiliation with the organization. For example, users can be employees, students, and/or faculty of a business or education institution, or users having email accounts with third-party email providers, among other possibilities. Also in this example, each user has a unique email address and a corresponding general email inbox that accumulates email messages inbound to the user's email address and displays those email messages to the user, as is well-known in the art. As those skilled in the art also know, email messages received in the general email inbox can come from any email account regardless of whether or not the sending email account is internal or external to the email system providing the users' general email boxes.

The method 100 is embodied in computer-executable instructions that are executed by a suitable computing system, which may be any type of computing system suitable for providing the described functionalities. One skilled in the art will readily understand the types of computing systems that are suitable for implementing the method 100. As is well-known, the machine-executable instructions may be stored in any suitable computer-readable storage medium/media, which includes any suitable type of non-volatile or volatile hardware memory. Those skilled in the art will readily understand that the term "computer-readable storage medium/media" does not cover transient media, such as signals on carrier waves. The various functionalities of the method may be embodied in computer-executable instructions in any suitable manner, such as via a plugin to an existing email system, in new code and/or code modules added to existing email system software, or simply as code in new email system software, among others, and any combination thereof. Fundamentally, there is no limitation on how the method 100 is embodied in computer-executable instructions as long as the requisite functionality is provided.

In this example, each general email inbox is configured to store metadata regarding email messages contained in the general email inbox. Examples of such metadata include, but are not limited to, a timestamp indicating when the general email inbox received an email message, Internet protocol (IP) address information, and certain email message header information (such as return-path, in-reply-to, subject, sender address, DKIM (DomainKeys Identified Mail) authentication), perhaps among other data. In addition to the general email inboxes storing metadata regarding email contained therein, in this example, each email message includes header information that may include information regarding the sender(s), recipient(s), action history (e.g., send, forward, reply, carbon copy, etc.), return-path, in-reply-to, subject, sender address, and attached items, perhaps among other information.

At block 105 in FIG. 1, the example method 100 includes receiving, at a designated phishing email inbox, email messages forwarded (reported) by ones of the plurality of email users from their corresponding respective general email inboxes. Generally, the email messages that the users forward should be email messages that they either know or suspect are phishing email messages. For the sake of convenience, these email messages can be referred to as "suspected phishing email messages" and more generally as "suspected phishing electronic message" with the understanding that a suspected phishing email or electronic message may in fact be known to be a phishing message. With increases in knowledge of phishing scam techniques, such as increases resulting from implementing one or more methods of the present disclosure, the accuracy and consistency of users in identifying phishing email messages will increase accordingly. In some embodiments, the designated phishing email inbox is an email inbox set up by the organization at issue (e.g., business, school, etc.), for example, as part of a corresponding phishing training program and/or competitive phishing learning game. As discussed below, this example method 100 uses this designated phishing email inbox and email messages received from the users contained therein to automatically determine a variety of information, including, but not limited to discerning whether or not each of the email messages is an original reporting of an email message and whether or not each of the email messages is a phishing email.

As used herein, an "original reporting" of an email message (phishing email message) is a reporting of an email message (phishing email message) that was not a forwarded version of an email message (phishing email message) originally received by another user, such as another user on the email system of the organization at issue. In some embodiments, such as embodiments in which the method 100 is implemented as part of a competitive game, it is desirable to determine whether or not the forwarding by a user of an email message to the designed phishing email inbox is an original reporting to stop devious users from accumulating points that they do not necessarily deserve. For example, a devious user may enlist one or more other users to forward phishing email messages they identify to the devious user, who would then reforward those phishing email messages to the designated phishing email inbox to participate in the competitive phishing game. If the system did not automatically assess the original-ness of the reporting by the devious user, then the system could simply assign a certain number of points, or other success measurement, to the devious user, crediting them for successfully identifying those phishing email messages, even though the devious user did not actually make the identifications. By automatically analyzing email-message reporting for original-ness, improper crediting of points can be avoided. Avoiding improper crediting of points can increase the effectiveness of a phishing training campaign, as user can only get points for original reportings, which generally means that they, themselves, will need to assess email messages for indicia of a phishing email scam and decide whether or not to forward known or suspected phishing email messages to the designated phishing email inbox, as opposed to relying on someone else's knowledge.

At a meta-block 110, the example method 100 includes the following blocks 115 to 140 that are generally directed to steps that the method performs for each of the email messages that are present in the designated phishing email inbox. It is noted that the blocks 115 to 140 do not necessarily need to be executed in the order presented, nor do the blocks have to be executed at any particular point in time (e.g., periodically) or based on any status of the designated phishing email inbox and/or the email messages therein. Regarding the latter, blocks 115 to 140 can be executed at any time, including for each incoming email message at the time the email arrives in the designated phishing email inbox or in batches, for example, periodically or after the designated phishing email inbox has accumulated a set number of unprocessed email messages, among other schemes. Further, it is noted that some of the blocks 115 to 140 may be executed at differing times, with differing batches, and/or on differing schedules, among other variations.

At block 115, phishing-analysis data is electronically collected from the email message that one of the users has forwarded to the dedicated phishing email inbox. In this context, phishing-analysis data can include any information from the email message, including, but not limited to, the message subject, the original sender, the forwarder, intervening recipients other than the forwarder, one or more date-time stamps of sending and/or receiving, and message-body content, among others, singly or in any combination with one another. Phishing-analysis data can be collected from any one or more parts of the email message, including the header and body of the email message.

At block 120, a phishing-analysis computer algorithm operates on the phishing-analysis data and electronic phishing knowledgebase to determine whether or not the email message is a phishing email message. The phishing knowledgebase may include any one or more datastores and/or one or more data-feeds containing information about known phishing campaigns and/or known telltale indicia of phishing scam email messages against which the phishing-analysis data collected from the email message is automatically compared by the phishing-analysis computer algorithm to determine whether or not the email message is actually a phishing email message.

At block 125, message-identifying data from the email message is electronically collected from the email message for uniquely identifying the email message. Message-identifying data may include the original sender, the forwarder, the message-subject, and/or one or more date-time stamps, among other data. In some embodiments the message-identifying data may be a subset of the phishing-analysis data discussed above, and when this is so, electronic collection steps of blocks 115 and 125 may be performed at the same time. In some embodiments, the message-identifying data may be different from the phishing-analysis data and/or the electronic collection steps of blocks 115 and 125 may be performed at differing times.

At block 130, metadata for the email message is electronically retrieved from the general email inbox of the user that forwarded the email message to the dedicated phishing email inbox using the message-identifying data electronically collected at block 125. Following is example metadata that can used as part of the process to determine if a specific email message is a phishing attempt: subject, sender email address, sender IP address, reply-to address, sent date and time, attachments, and any URLs in the email body. Any standard information from an email header can also be available, for example content-type and delivery path, among others.

At block 135, a reporting-analysis computer algorithm is executed to determine whether or not the forwarding of the email message to the designated phishing email inbox is an original reporting. To do this, the reporting-analysis computer algorithm operates on the message-identifying data collected at block 125 and the metadata retrieved at block 130. For example, as noted above it is desirable to not award points to a user (the reporting user) that has simply forwarded, to the designated phishing email inbox, a phishing email message that another user forwarded to the reporting user, because the reporting user presumably did not originally identify the email message as being a phishing email message. For example, if the method 100 is deployed in a competitive training game that awards the highest point earner with a prize, the two users may be in cahoots with one another to cooperate to acquire the largest number of points to win the prize, which they would then share with one another.

At block 140, when both the phishing-analysis computer algorithm determines that the email message is a phishing email message and the reporting-analysis computer algorithm determines that the email message is an original reporting of the email message (i.e., the phishing email message), the email message is electronically reported to a phishing agent as an original reporting. In this context, a "phishing agent" is any recipient of the reporting that uses the determination of an original reporting for one or more purposes. For example, the phishing agent may be a tallying agent (e.g., a software module or algorithm) that tallies and/or tracks original reports, a point-assignment agent (e.g., a software module or algorithm) that assigns points to the reporting user, a knowledgebase-building agent (e.g., a software module or algorithm) that builds the phishing knowledgebase, and any combination thereof, among others. In some embodiments the reporting of the email as an original reporting may be accompanied by a copy or forwarding of the email message, or any suitable portion(s) thereof, and/or the phishing-analysis data collected at block 115, and/or the message-identifying data collected at block 125, and/or the metadata retrieved at block 130, among other things.

In some embodiments, the method 100 of FIG. 1 may include the phishing agent being a point-tallying system and further include electronically determining a reporting time using the message-identifying information collected at block 125 and/or the metadata electronically retrieved at block 130. In some embodiments, the reporting time is the time interval between the time that the reporting user received the email message in their general email inbox and either the time that they forwarded the email message to the designated phishing email inbox or that the designated phishing email inbox received the forwarded email message. In some embodiments, the reporting time may be used to assign points to the forwarding user according to how quickly they reported the email message as a known or suspected phishing email message. Consequently, the method 100 may further include assigning a reporting-time value to the reporting time based on quickness of the user reporting the email message and then electronically reporting the reporting-time value to the point-tallying system.

In some embodiments, the method 100 may include the phishing agent being a point-tallying system in a scenario in which a reporting user can, if desired, annotate the email message with information identifying one or more of the telltale indicia of a phishing email message. For example, if the scenario awards more points to reporting users based on the number of telltale indicia that they properly identify in the forwarded email messages, then the method 100 may use user annotations to determine how many telltale indicia that the users properly identify. For example, the method 100 may further include electronically retrieving at least one user-annotation from the email message and executing an assessment and scoring algorithm that operates on the retrieved at least one user-annotation to determine correctness of the at least one user-annotation and assign an assessment value based on the correctness. The method 100 may then include electronic reporting to the phishing agent that includes reporting to the point-tallying system a point value that includes the assessment value. In some embodiments, the method 100 may include both the reporting-time and user-annotation features just described.

In some embodiments in which a reported phishing email message may be either an actual phishing email or a simulated phishing email, the method 100 may further include a message categorization algorithm for determining whether the email message is an actual phishing email or a simulated phishing method. This can allow the method to perform any one or more of a variety of useful tasks, such as tally the number of actual phishing email messages reported versus the number of simulated email messages reported, performing statistical analysis(es) on one or both of the actual and simulated categories, report only actual phishing email messages to a phishing knowledgebase and/or security analyst, and reporting and/or sending suspected, but unconfirmed, phishing email messages to an analyst for further evaluation, among others.

Figure 2:
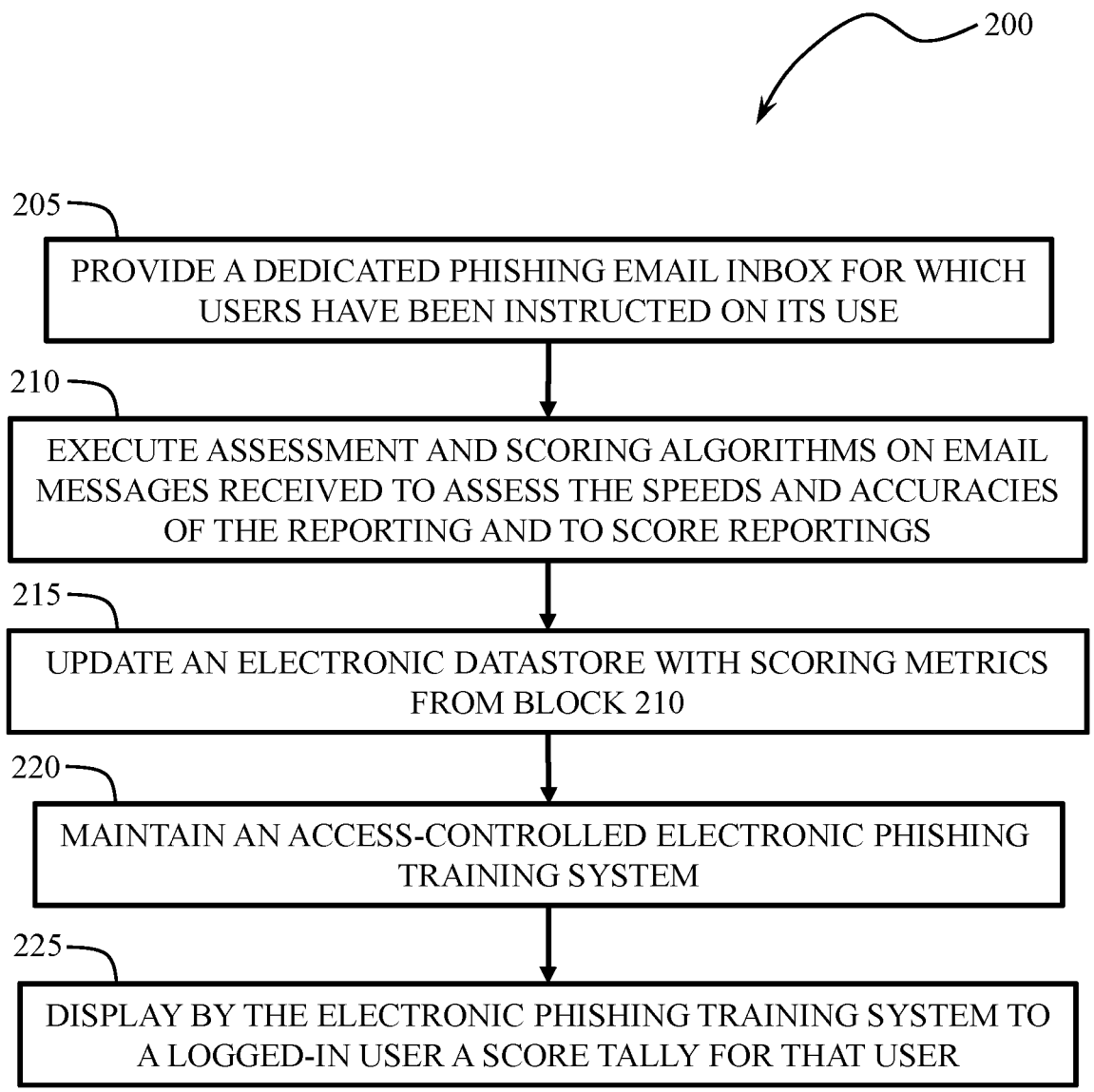
FIG. 2 is a flow diagram illustrating an example method of automatically training user to identify phishing email messages.

Referring now to FIG. 2, another example method 200 of the present disclosure is directed to training a plurality of users to identify phishing email messages. In this example, each of the users may have a corresponding unique general email inbox, for example, as provided by an organization that the users are affiliated with.

At block 205, a dedicated phishing email inbox is provided, wherein the users have been instructed to forward, to the dedicated phishing email inbox, email messages they receive in their respective general inboxes when they know or suspect that the email messages are phishing email messages so as to report the email messages. As described above, in some embodiments each phishing email message that may be reported is only an actual phishing email message; in some embodiments each email message that may be reported is only a simulated phishing email message; and in some embodiments each email message that may be reported can be either an actual phishing email message or a simulated phishing email message.

At block 210, assessment and scoring algorithms for assessing speeds of reportings and accuracies of the reportings of the email messages forwarded by the users and for assigning score metrics to the reportings are executed to ultimately obtain scorings for the reported email messages. Examples of assessment and scoring algorithms are discussed above in connection with FIG. 1, though one skilled in the art will readily appreciate that other algorithms can be devised and executed without undue experimentation to suit a particular design and/or need. At block 215, an electronic scoring datastore for tallying the scores assigned by the scoring algorithm is updated with the scoring metrics from block 210.

At block 220, an access-controlled electronic phishing training system is maintained. In this example, the access-controlled electronic phishing training system is configured to allow each of the users to login to a personal account on the access-controlled electronic phishing training system and to allow each logged-in user to view their own score tally. In some embodiments, the access-controlled electronic phishing training system is maintained independently of the email system that provides the users with their general email inboxes. As discussed below in a detailed example, the access-controlled electronic phishing training system may include many more features than just allowing each user to access their own score tally. In some embodiments, the access-controlled electronic phishing training system may be implemented as a web-based application that the users can access in one or more of a variety of ways, such as via an Internet browser, a dedicated mobile app, or either of these. In some embodiments, a user interface for allowing the users to access the access-controlled electronic phishing training system may be provided as a plugin to a desktop computer or laptop computer email application, such as Microsoft Outlook or Apple Mail, among others. In some embodiments, such a plugin may be in addition to or in lieu of browser-based and mobile-app-based access.

At block 225, the access-controlled electronic phishing training system displays to one of the users when that user is logged into the access-controlled electronic phishing training system the score tally for that logged-in user. It should be understood that the method 200 of FIG. 2 may include executing the method 100 of FIG. 1, one or more portions thereof, and/or any one or more of the methods discussed above in connection with method 100.

Figure 3:
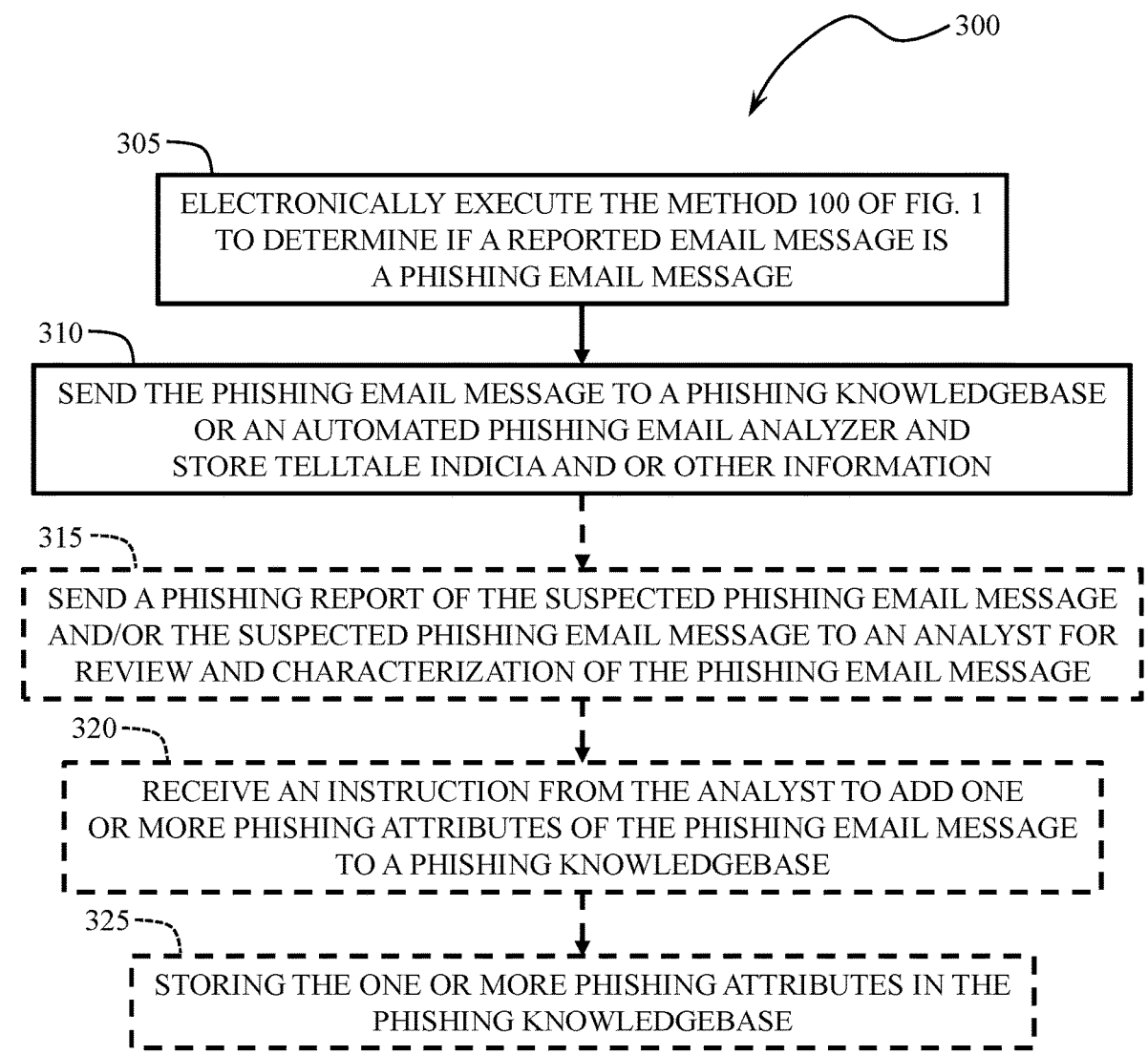
FIG. 3 is a flow diagram illustrating an example method of automatically building a phishing knowledgebase to assist an organization in maintaining a secure organizational email system.

FIG. 3 illustrates an example method 300 of building a phishing knowledgebase to assist an organization in maintaining a secure organizational email system. In this example, the method 300 includes, at block 305, electronically executing the method 100 of FIG. 1 so as to determine whether or not each email message received by the designated phishing email inbox is an actual phishing email message and is an original reporting of the actual phishing email message. In some embodiments, the step of determining whether or not an email message is a phishing email message may include, in addition to binarily categorizing an email message as either a phishing email message or a non-phishing email message, categorizing an email message as a suspected phishing email message. For example, in some cases, various types of phishing-scam telltale indicia can have differing confidence values that indicate strengths of the indicia in indicating an actual phishing email message. In an example, if an email message has only a few weak telltale indicia, then the computing system may determine that the overall confidence that the email message is a phishing email message is not high enough to categorize the email message as a phishing email message and is also not low enough to categorize the email message as a non-phishing email message. In some embodiments, in such cases, the computing system may characterize the email message as a suspected phishing email message.

At block 310, when the method 100 determines that an email message is a phishing email message, the computing system may send the email message to a phishing knowledge database, which may be associated with an automated analyzer for extracting telltale indicia and/or other information about the email and store that information in the phishing knowledgebase. At optional step 315, if the method 100 determines that the email messages is a suspected phishing email message, then the computer system may send a phishing report of the suspected phishing email message or send the suspected phishing email message, or both, to an analyst for review and characterization of the suspected phishing email message. Typically, but not necessarily, the analyst is a human analyst, and the analyst is able to assess whether or not any attributes of the phishing email address should be added to the phishing knowledgebase for use in screening future email messages for indicia of phishing scams and/or whether to identify the suspected phishing email message as a legitimate phishing email message.

If the method 100 has characterized an email message as a suspected phishing email message, after the analyst has identified one or more phishing attributes within the identified phishing email address, at optional block 320 the computer system may receive an electronic instruction from the analyst to add the one or more phishing attributes from the identified phishing email message to the phishing knowledgebase. At optional block 325, the computer system stores the one or more phishing attributes in the phishing knowledgebase for use in discerning future email messages as phishing email messages. Those skilled in the art will readily appreciate that the method 300 can include any one or more of the methods discussed above in connection with method 100 and FIG. 1, among other variations.

Figure 4:
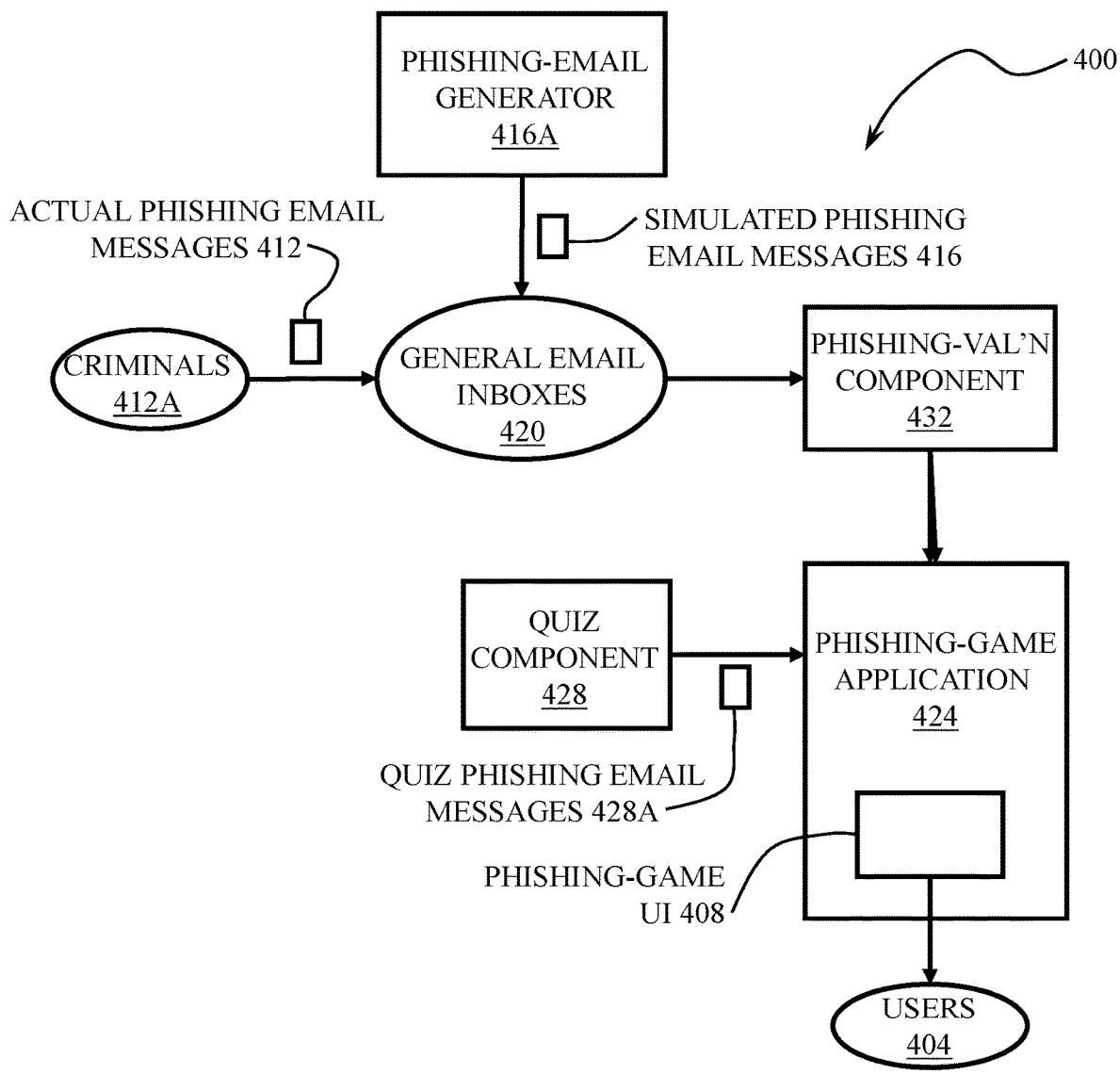
FIG. 4 is a high-level block diagram illustrating an example phishing-game system made in accordance with aspects of the present disclosure.

As discussed above, each of the foregoing example methods 100, 200, and 300 of FIGS. 1, 2 and 3, respectively, can be implemented by itself, in combination with one another, or in the context of a particular application, such as a competitive-game-type phishing training system, or simply "phishing game" for short. FIG. 4 illustrates an example phishing-game system 400 that incorporates such a phishing game.

Referring now to FIG. 4, in one embodiment, the example phishing-game system 400 may include involving one or more groups of users of an organization's email system in the competitive game. In one example, the phishing game portion of the phishing-game system 400 allows participating users 404 to attempt to accrue points to win prizes. For example, the three users 404 having the three highest point totals may each win a prize, with the values of the prizes increasing from the lowest of the three point totals to the highest of the three point totals. In some embodiments, one or more of the prizes may be provided by the organization and/or may be provided by a third-party sponsor, for example a restaurant in close proximity to the users and/or organization that is willing to sponsor the prize in exchange for the advertising value of the sponsorship. Correspondingly, the phishing-game system 400 may include one or more web-pages (not illustrated, but part of a phishing-game user interface (UI) 408) that the users can access to view details about the prizes. In some embodiments, the phishing-game system 400 may include an administrator portal (not illustrated) that allows an administrator (not illustrated) to update any necessary information on the phishing game, including updating information on the prizes and/or sponsors, among many other things.

In some embodiments, the phishing-game system 400 may involve both actual phishing email messages 412 and simulated phishing email messages 416. In this example, FIG. 4 illustrates the actual phishing email messages 412 as originating from criminal 412A and the simulated phishing email messages 416 as originating from a phishing-email generator 416A, with both types of phishing email messages arriving at each user's general email inbox 420. In some embodiments, phishing-email generator 416A may be configured to allow an administrator to set an automated schedule for sending simulated phishing email messages to each general email inbox and/or configured to provide a phishing-email-builder UI (not shown) that allows someone to construct simulated phishing email messages and/or include an automated phishing-email-builder component (not shown) that constructs simulated phishing email messages automatedly, for example, from actual phishing email messages, a datastore of components of phishing email messages, and/or from previous simulated phishing email messages, among other things.

As noted above, actual phishing email messages 412 are real phishing email messages that may turn up in a user's general email inbox 420 on occasion from an actual phishing email criminal 412A. Of course, the timing of the receipt of actual phishing email messages 412 in the general email inbox 420 is uncontrolled. As also noted above, simulated phishing email messages 416 are phishing email messages that are made to look like actual phishing email messages but are under the complete control of, for example, the organization utilizing the phishing game and are innocuous, e.g., include hyperlinks to material that the organization controls. Simulated phishing email messages 416 can be previously received actual phishing email messages (not shown) modified to remove any harmful content, based in other ways on actual phishing email message, or made up by an expert, and any combination thereof. Since the simulated phishing email messages 416 are under the control of the organization, the organization can control their frequency of dissemination to each user's general email inbox 420 in coordination with the phishing game.

The phishing-game system 400 may include a phishing-game application 424, such as an enterprise- intranet-, Internet-, or extranet-based application, among others. The phishing-game application 424 may be configured to provide user-facing functionality, such as the phishing-game UI 408 that allows each user 404 to access various features of the phishing game, such as a quiz feature (here, provided by a quiz component 428), game-standings (e.g., points standing, prize standing, and quiz scores, among others), other information (e.g., game-play instructions, prize description, and sponsor information, among other things), and/or user-account setup and management, among other things. As one skilled in the art will appreciate, the phishing-game application 424 may be web-based so as to allow users and administrators to access the phishing-game application via a web browser (not illustrated). In some embodiments, the phishing-game system 400 may include mobile apps (not illustrated) that run on mobile devices (e.g., smartphones) carried by at least some of the users 404 to provide the functionalities of the phishing-game application 424 described herein and/or any other functionality(ies) that may be desirable for implementing a competitive phishing training game, such as the phishing game of this illustrative phishing-game system of FIG. 4.

In this example, the quiz component 428 generates quizzes for the users in which each user answers questions about phishing and/or identifies parts of quiz phishing email messages 428A that are telltale indicia of a typical actual phishing email message. A quiz phishing email message 428A may be the same as a simulated email message 416 except that the user 404 does not receive it through their general email inbox 420; rather they can access it via a quiz UI (here, part of the phishing-game UI 408) that is separate from the general email inbox. In some embodiments, each user may identify telltale indicia of quiz phishing email messages 428A in any of a variety of ways, such as by selecting each region of the displayed phishing email message that contains one of the telltale indicia or by any other manner known in computer-based testing. The phishing game may also or alternatively include features of allowing users 404 to annotate actual and/or simulated phishing email messages 412, 416 that they receive in their general email inboxes 420, for example as discussed above in connection with FIG. 1.

In this example, phishing-game system 400 includes a phishing-validation component 432 that performs a variety of functions for facilitating the phishing game of this example. At a high level, aspects of the phishing-validation component 432 can be considered to provide a transformation connector (see above) that effectively transforms data about phishing email messages for used in the phishing-game application. In some embodiments, the phishing-validation component 432: 1) receives a report of a phishing email message (here, either an actual phishing email message 412 or a simulated phishing email message 416) from any of the users 404 (e.g., by the user forwarding a known or suspected phishing email message from their general email inbox 420 to a designated phishing email inbox (not illustrated); 2) collects incident details from the reporting user's general email inbox (e.g., retrieves the reported (known/suspected) email message from the reporting user's general email inbox; 3) verifies, or not, that the reported email message is a phishing email message and that the reported email message is an original reporting of the phishing email message; and 4) scores the reporting of the (phishing) email message. Optionally, as noted above in connection with FIG. 1, when the phishing-game system 400 allows each user 404 to annotate a known or suspected phishing email message to identify the telltale indicia within such phishing email message, the phishing validation component 432 may also, or alternatively, include one or more subcomponents for determining the correctness of the annotates and scoring the annotations.

In some embodiments, the receiving of a report of a known or suspected phishing email message may include collecting information from the reported email message, such as the reporting time, an identification of the reporting user 404, the subject of the reported email message, an identification of the sender that sent the reported email message to the reporting user, and a date-time stamp for when the user received the reported email in their general email inbox 420, among other information.

In some embodiments, the collecting of incident details from the general email inbox 420 of the reporting user 404 may include collecting original message metadata such as the subject of the original email, a message identifier, an email address of the sender of the reported email to the reporting user's general email inbox, an originating IP address of the sender, a date-time stamp of the time that the reporting user's general email inbox received the reported email message, any links and/or URLs contained in the original email, and any attachment hashes, among other things.

In some embodiments, verifying the reported email message may include analyzing the original message metadata and determining a user-reporting speed. Examples of analyzing the original message metadata may include, but not be limited to: reviewing and matching portions of the original message metadata against known actual phishing campaigns; checking portions of the original message metadata against known intelligence feeds concerning actually phishing campaigns and known actual phishing email messages; collating training metrics and portions of the original message metadata for an analyst analysis determination (e.g., SPAM message, phishing message, regular message, or other desired training metric); recording the analyst's determination (e.g., logging the identified incident and decision result as a known campaign; and verifying the reporting as an original reporting, i.e., that the original email message was received by the reporting user 404 and, for example, not a previously forwarded email message identified by another user (this can prevent unfair gameplay, as discussed above); among other things. In determining the reporting speed of the reporting user 404, the phishing-validation component 432 may simply calculate the difference between the date-time stamps for when designated phishing email inbox received the reported email message and when the reporting user's general email inbox originally received the reported email message.

In some embodiments, the scoring of a reporting may include assigning scoring metrics based on, for example, any one or more of the following: accuracy of the reporting (phishing email message or not), speed of the reporting, and correctness of identifying telltale indicia (if included). In some embodiments in which the phishing-game application 424 is implemented as a web-based application, the phishing-validation component 432 may provide scoring metrics to the phishing-game application via a representational state transfer (REST/RESTful) application programming interface (API) of the phishing-game application. Of course, other implementations and architectures may involve other configurations. In some embodiments, a RESTful API solution is unique because it receives phishing-validation scoring metrics in addition to person identification, specifically to support the gamification (the phishing-game application). By changing the meaning of the data that the RESTful API receives, this novel solution can present meaningful analysis to administrators while simultaneously providing user-facing scoring and competition metrics to increase engagement and adherence to best practices.

Figure 5:
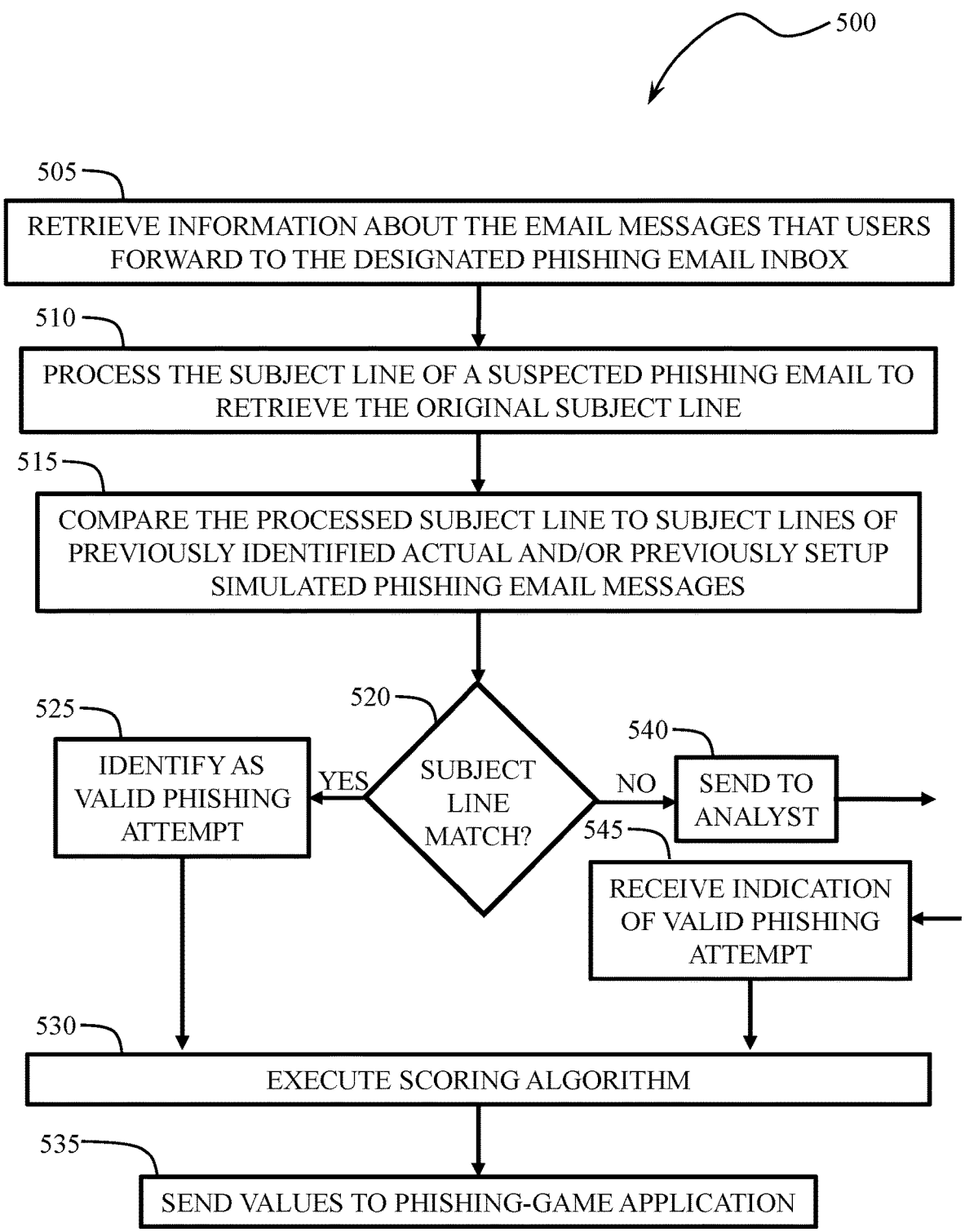
FIG. 5 is a flow diagram illustrating an example validation and scoring method that the phishing-validation component of the example phishing-game system of FIG. 4 may perform.

FIG. 5 illustrates an example validation and scoring method 500 that can be performed by a suitable system or component thereof, such as the phishing-validation component 432 of the phishing game system 400 of FIG. 4. In some embodiments, some or all of the validation and scoring method 500 may be implemented in a RESTful API solution or other suitable architecture. In the context of FIG. 4, in an example, a RESTful API solution implementing the validation and scoring method 500 resides functionally between an email application (e.g., that provides general email inboxes 420 (FIG. 4) and other email features and functionalities) and the phishing-game application 424, as will be understood by one skilled in the art.

Referring to FIG. 5 and also to FIG. 4, the validation and scoring method 500 includes block 505 at which the phishing-validation component 432 retrieves information about emails that users forward, i.e., report, to the designated phishing-email inbox. In some embodiments the phishing-validation component 432 can do this by parsing the relevant email logs. At block 510, the phishing-validation component 432 processes the subject line of one of the reported suspected phishing email messages to reveal the original subject line. For example, the phishing-validation component 432 may remove any occurrence(s) of information added to the subject line, such as "FW:", "RE:", automated filing identifiers, etc.) after the original sender composed the original subject line. The phishing-validation component 432 may use a suitable log-file processing algorithm to perform this processing at block 510. At block 515, the phishing-validation component 432 compares the processed subject line to one or more stored lists of subject lines of phishing email messages previously identified as actual phishing attempts and/or previously set up as simulated phishing attempts. In some embodiments, the stored list(s) of subject lines may be stored in the known phishing datastore.

At block 520 the phishing-validation component 432 determines whether or not the processed subject line matches any of the stored subject lines indicating either a previously identified phishing email message or a previously set up simulated phishing email message. If the phishing-validation component 432 finds a match, at block 525 the phishing-validation component identifies, or classifies, the corresponding suspected phishing email message as a valid phishing attempt. Then, at block 530, the phishing-validation component 432 executes a scoring algorithm to determine one or more values for scoring the reporting of this particular confirmed reported phishing email message. For example, the scoring algorithm may assign values (e.g., based on predetermined scoring bases) for time to report, type of phishing email message (e.g., actual versus simulated), and recipient, among other things, and then calculate an overall contest score based on these values. Regarding assigned values, in some examples points can be assigned by broad type (e.g., actual versus simulated phishing email message) or as specific point values when the analyst adds an email to a confirmed phishing email list. In some embodiments, prizes can be assigned in place of or in addition to points, such as for the first person to report each new phishing email message. To aid the scoring algorithm, the phishing-validation component 432 may use a log-file processing algorithm. At block 535, the phishing-validation component 432 may send the values determined at block 530 via a RESTful API to the phishing-game application 424. In some embodiments, for each reported phishing email message, the phishing-validation component 432 may send a user ID, a time to report, type of phishing email (e.g., actual versus simulated), points to add for the phishing email message and/or a prize, if defined. The phishing-game application 424 may maintain an overall contest score for each user (player) The values sent represent the specific score and/or prize in the instance of a successful reported phishing email message, with its individual point value sent from the phishing validation component 432.

If the phishing-validation component 432 determines at block 520 that the processed subject line of the suspected phishing email message does not match any of the stored subject lines, at block 540 the phishing-validation component may send the suspected phishing email message to an analyst for review and classification, for example, by sending the suspected phishing email message to an analyst dashboard. In some embodiments, the analyst is a human analyst who reviews the suspected phishing email message. The analyst can then classify the suspected phishing email message for future automated processing and update the known phishing datastore based on that classification. The analyst is thereby informed of this potential new attack and can check for multiple reports of the same text (indicating a widespread attack), for example, using a log file processing algorithm. In some embodiments, the analyst can decide how many contest points a report of this attack is worth and add that to the known phishing datastore.

If the analyst determines that the reported suspected phishing email message is a valid phishing attempt, the analyst may send, and the phishing-validation component 432 may receive at block 545, an indication of a valid phishing attempt. In response, the validation and scoring method 500 may proceed to blocks 530 and 535 at which the phishing-validation component 432 first executes a scoring algorithm based on the newly classified valid phishing email message and then sends the determined values to the phishing-game application 424.

It is emphasized that the configuration of the example phishing-game system 400 of FIG. 4 is merely illustrative and that many variations are possible. In this connection, it is noted that the various blocks shown in FIG. 4, such as the blocks for the phishing-email generator 416A, phishing-game application 424, the quiz component 428, and phishing-validation component 432, among others, are not necessarily provided to imply any particular structure (e.g., code blocks, modules, etc.) to the computer code for the phishing-game system 400. Rather, such blocks are provided for ease of presentation and understanding of certain functionalities of the example phishing-game system 400.

Although the foregoing examples center on phishing messages that are sent and received by email systems, those skilled in the art will readily appreciate that phishing messages can be sent via other modes of electronic communication, such as other point-to-point messaging systems that are typically partly, mostly, or even exclusively present on mobile devices, such as smartphones, smart tablets, and smartwatches, among others. Examples of such other electronic messaging include, but are not limited to, short messaging service (SMS) messaging, multimedia messaging services (MMS) messaging, app-based messaging via various mobile apps such as WhatApp, Snapchat, Instagram, Facebook, LinkedIn, iMessage, and Google Messages, among many others. Those skilled in the art will understand how to adopt and/or adapt aspects of the present disclosure to such other electronic messaging systems where phishing messages can be received by users of such messaging systems.

Figure 6:
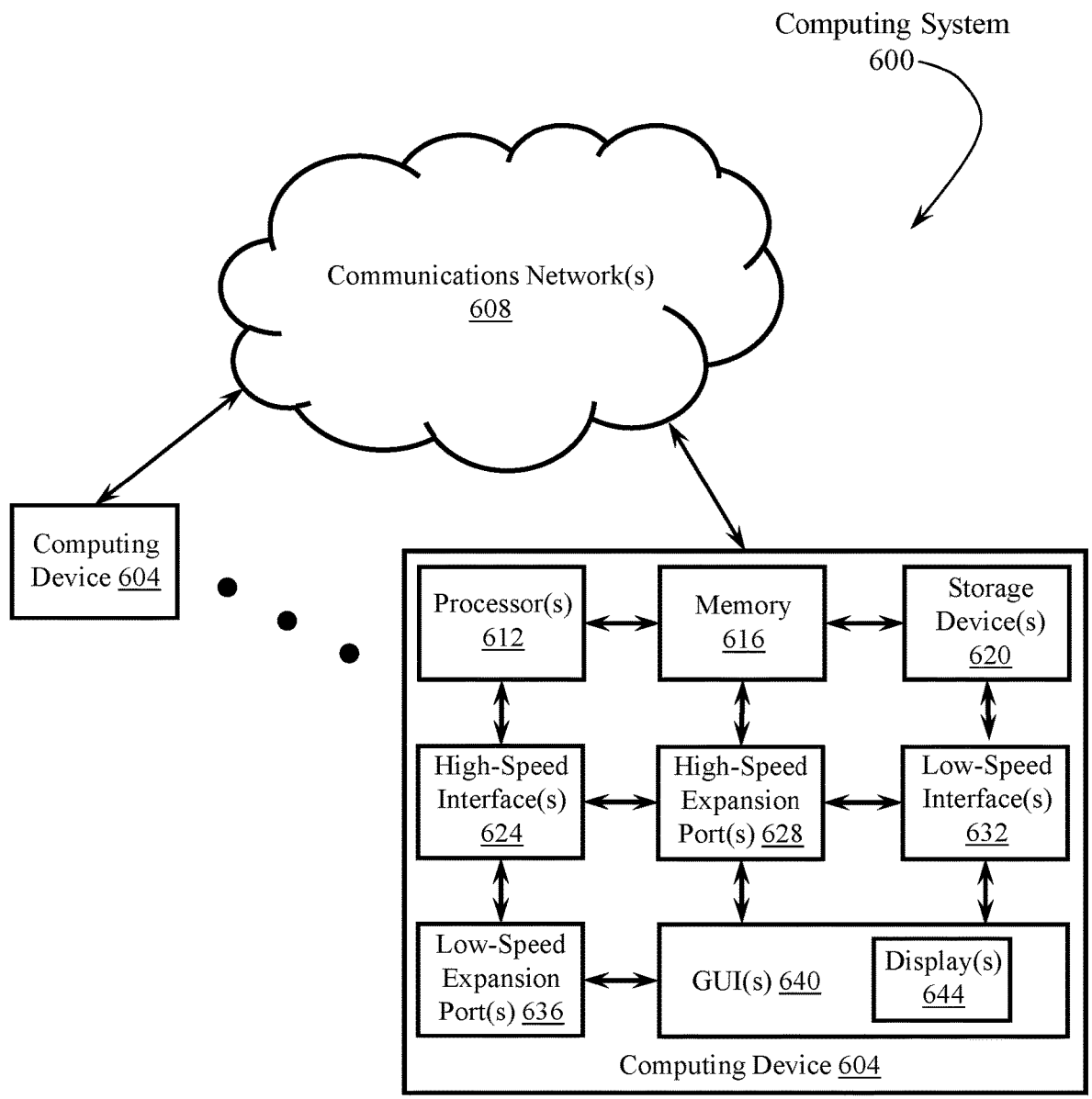
FIG. 6 is a high-level block diagram of an example computing system, and example components thereof, that can be used to implement any one or more methods, systems, subsystems, aspects, and/or features of the present disclosure.

Some embodiments, including the methods 100, 200, 300, and 500 of FIGS. 1, 2, 3, and 5, respectively, may be executed in a computing system, such as computing system 600 of FIG. 6, or any suitable portion thereof. In addition, the phishing-game system 400 or portion(s) thereof, and/or similar systems or related portion(s) thereof disclosed herein, may be implemented on the computing system 600 of FIG. 6 or any suitable portion(s) thereof. In this example, the computing system 600 includes a plurality of computing devices 604 networked together via one or more communications networks (here, individually and collectively represented by communications network 608). As those skilled in the art will readily appreciate, the communications network 608 may include any one or more types of communications networks, including, but not limited to, the Internet or other global network, one or more wide-area networks, one or more local-area networks, one or more personal-area networks, and/or one or more cellular networks, among others, in any suitable combination and arrangement.

Each computing device 604 (only one shown with detail) may be any suitable computing device, such as, but not limited to, a smartphone, a wearable computer, a tablet computer, a laptop computer, a desktop computer, a network server, a mainframe computer, or any other device capable of executing machine-executable instructions for performing any one or more of the aspects and/or features disclosed herein. In this example, each computing device 604 may include one or more processors 612, high-speed memory 616, one or more storage devices 620, one or more high-speed interfaces 624, for example, connected to the high-speed memory and one or more high-speed expansion ports 628, and one or more low-speed interfaces 632 connecting to one or more low-speed expansion ports 636 and the storage device(s). Each of the components 612, 616, 620, 624, 628, and 632, may be interconnected with one another in any suitable manner, such as using one or more busses or other suitable connections as indicated in FIG. 6 by unlabeled arrows connecting components. It is noted that these arrows are only generally representative and do not necessarily represent actual communications connections, nor all communications links between/among the various ones of the components 612, 616, 620, 624, 628, and 632.

Each processor 612 may process machine-executable instructions (not shown, but present in the high-speed memory 616 and/or in the storage device(s) 620) for execution within the corresponding computing device 604, including instructions for performing any methods and/or processes needed to effect the relevant aspects and/or functionalities, including machine-executable instructions providing the computer operating system, effecting communications with any external device(s), displaying graphical information via a graphical user interface 640 presented on one or more displays 644 and/or on an external user interface device, for example, coupled to the high-speed interface(s) 624. It is noted that multiple ones of the computing devices 604 may be connected to act as a single computing device, for example, with each computing device providing one or more portions of the necessary operations (e.g., as a server bank, a group of blade servers, or a multi-processor system, among other things).

The high-speed memory 616 may be composed of any suitable type of high-speed memory such as, but not limited to, RAM, cache memory, bios memory, ROM, among others, in any amount and in any combination. The storage device(s) 620 is/are capable of providing mass storage for each computing device 604 and may contain, for example, the machine-executable instructions for that computing device, as well as any other information, stored in any suitable manner, such as files, databases, etc., needed for enabling the full functionality of the computing device. Each storage device 620 may be a solid-state-memory device, a hard-disk device, an optical-disk device, a floppy-disk device, a tape device, or an array of devices, including devices in a storage area network or other configuration. Collectively, the high-speed memory 616 and the storage device(s) 620 are hardware memory that are sometimes referred to herein and in the appended claims, collectively, singly, and/or in any suitable combination as "computer-readable storage medium". It is specifically noted that the term "computer-readable storage medium" excludes transitory signals comprising one or more carrier signals encoded with digital information.

The high-speed interface 624 manages higher-bandwidth-intensive operations for the computing device 604, while the low-speed interface 632 manages lower-bandwidth-intensive operations. Such allocation of duties is merely an example and is nonlimiting. In one implementation, the high-speed interface 624 is coupled to the high-speed memory 616, the display 644 (e.g., through a graphics processor or accelerator (not shown)), and to the high-speed expansion port(s) 628, which may accept various expansion cards (not shown). In the implementation shown, the low-speed interface 632 is coupled to the storage device 620 and the low-speed expansion port(s) 636. The low-speed expansion port(s) 636, which may include one or more of various communication ports (e.g., USB, Bluetooth, Ethernet, wireless Ethernet, etc.) may be coupled to one or more input/output devices, such as, but not limited to, the display(s) 644, a keyboard, a pointing device, and/or a scanner and/or one or more networking devices, such as a switch or router, e.g., through a network adapter.

Various implementations of the systems and techniques described herein can be realized in digital electronic circuitry, integrated circuitry, specially designed ASICs (application specific integrated circuits), computer hardware, firmware, software, and/or any combination thereof, among other things. These various implementations can include implementation in one or more computer programs, software modules, browser plugins, and/or apps that are executable and/or interpretable on a programmable system including at least one digital processor, which may be a special- or general-purpose processor, coupled to receive data and/or instructions from, and to transmit data and/or instructions to, hardware memory, at least one input device, and/or at least one output device.

To provide for interaction with a user, methods, systems, and techniques and any portion(s) thereof described herein can be implemented on a computer having a display device (e.g., an LED display, an OLED display, or an LCD display, among others) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or haptic feedback); and input from the user can be received in any form, including acoustic, speech, or tactile input.

Methods, systems, and techniques and any portion(s) thereof described herein can be implemented in a computing system that includes one or more back-end computing devices 604 (e.g., as a data server), one or more middleware computing device(s) 604 (e.g., an application server), and/or one or more front-end computing devices 604 (e.g., a client computing device having a graphical user interface or a Web browser through which a user can interact with an implementation of the systems and techniques described here). As indicated above, the computing devices 604 of the computing system 600 can be interconnected by any form or medium of wired or wireless digital data communication (e.g., a communication network) as expressed by communications network(s) 608, examples of which are discussed above.

In some aspects, the present disclosure is directed to a method of training a plurality of users to identify electronic phishing messages, wherein the users have corresponding respective email inboxes. The method includes providing a designated phishing message inbox to which the users are to make reportings of suspected phishing electronic messages by forwarding suspected phishing electronic messages to the designated phishing message inbox; executing assessment and scoring algorithms to assess the speeds of reportings and accuracies of the reportings of the suspected phishing electronic messages forwarded by the users and to assign scores to the reportings and/or the corresponding ones of the users; updating an electronic scoring datastore, for the plurality of users, with the scores assigned by the scoring algorithm; maintaining an access-controlled electronic phishing training system that allows each of the users to log-in to a personal account on the access-controlled electronic phishing training system, wherein the access-controlled electronic phishing training system is designed and configured to allow each logged-in user to view their own score tally; and displaying by the access-controlled electronic phishing training system to one of the users when that user is logged in to the access-controlled electronic phishing training system, the score tally for that logged-in user.

In one or more embodiments of the method, further comprising determining the suspected phishing electronic message are original reportings, wherein executing assessment and scoring algorithms is predicated on the reportings being original reportings.

In one or more embodiments of the method, wherein determining whether the suspected phishing electronic messages are original reportings includes, for each suspected phishing electronic message: electronically collecting phishing-analysis data from the suspected phishing electronic message; executing a phishing-analysis computer algorithm that operates on the phishing-analysis data and on an electronic phishing knowledgebase to determine whether or not the suspected phishing electronic message is an electronic phishing message; electronically collecting message-identifying data from the suspected phishing electronic message for uniquely identifying the suspected phishing electronic message; using the message-identifying data, electronically retrieving metadata for the suspected phishing electronic message from the electronic-message inbox of the user that forwarded the suspected phishing electronic message to the designated phishing message inbox; and executing a reporting-analysis computer algorithm that operates on the message-identifying data and the metadata to determine whether or not the forwarding of the suspected phishing electronic message to the designated phishing message inbox is an original reporting.

In one or more embodiments of the method, wherein the electronic knowledgebase includes a database of known phishing campaigns.

In one or more embodiments of the method, wherein the electronic knowledgebase includes known phishing intelligence feeds.

In one or more embodiments of the method, further comprising, when unable to automatically determine that the suspected phishing electronic message is an electronic phishing message, sending a phishing report to an analyst for review and characterization.

In one or more embodiments of the method, wherein the electronic phishing messages include actual electronic phishing messages.

In one or more embodiments of the method, wherein the electronic phishing messages include simulated electronic phishing messages.

In one or more embodiments of the method, wherein the electronic phishing messages include actual electronic phishing messages and simulated electronic phishing messages.

In some aspects, the present disclosure is directed to a computer-readable storage medium containing machine-executable instructions for performing a method of training a plurality of users to identify electronic phishing messages, wherein the users have corresponding respective email inboxes. The method includes providing a designated phishing message inbox to which the users are to make reportings of suspected phishing electronic messages by forwarding suspected phishing electronic messages to the designated phishing message inbox; executing assessment and scoring algorithms to assess the speeds of reportings and accuracies of the reportings of the suspected phishing electronic messages forwarded by the users and to assign scores to the reportings and/or the corresponding ones of the users; updating an electronic scoring datastore, for the plurality of users, with the scores assigned by the scoring algorithm; maintaining an access-controlled electronic phishing training system that allows each of the users to log-in to a personal account on the access-controlled electronic phishing training system, wherein the access-controlled electronic phishing training system is designed and configured to allow each logged-in user to view their own score tally; and displaying by the access-controlled electronic phishing training system to one of the users when that user is logged in to the access-controlled electronic phishing training system, the score tally for that logged-in user.

In one or more embodiments of the computer-readable storage medium, further comprising determining the suspected phishing electronic message are original reportings, wherein executing assessment and scoring algorithms is predicated on the reportings being original reportings.

In one or more embodiments of the computer-readable storage medium, wherein determining whether the suspected phishing electronic messages are original reportings includes, for each suspected phishing electronic message: electronically collecting phishing-analysis data from the suspected phishing electronic message; executing a phishing-analysis computer algorithm that operates on the phishing-analysis data and on an electronic phishing knowledgebase to determine whether or not the suspected phishing electronic message is an electronic phishing message; electronically collecting message-identifying data from the suspected phishing electronic message for uniquely identifying the suspected phishing electronic message; using the message-identifying data, electronically retrieving metadata for the suspected phishing electronic message from the electronic-message inbox of the user that forwarded the suspected phishing electronic message; and executing a reporting-analysis computer algorithm that operates on the message-identifying data and the metadata to determine whether or not the forwarding of the suspected phishing electronic message is an original reporting.

In one or more embodiments of the computer-readable storage medium, wherein the electronic knowledgebase includes a database of known phishing campaigns.

In one or more embodiments of the computer-readable storage medium, wherein the electronic knowledgebase includes known phishing intelligence feeds.

In one or more embodiments of the computer-readable storage medium, further comprising, when unable to automatically determine that the suspected phishing electronic message is an electronic phishing message, sending a phishing report to an analyst for review and characterization.

In one or more embodiments of the computer-readable storage medium, wherein the electronic phishing messages include actual electronic phishing messages.

In one or more embodiments of the computer-readable storage medium, wherein the electronic phishing messages include simulated electronic phishing messages.

In one or more embodiments of the computer-readable storage medium, wherein the electronic phishing messages include actual electronic phishing messages and simulated electronic phishing messages.

In some aspects, the present disclosure is directed to a method of building a phishing knowledgebase to assist an organization in maintaining a secure organizational email system, the method comprising: electronically executing the method of the foregoing aspect, when unable to determine that the email message is a phishing email message, sending a phishing report for the phishing email message to an analyst for review and characterization of the phishing email message; receiving an electronic instruction from the analyst to add one or more phishing attributes from the email message to the phishing knowledgebase; and storing the one or more phishing attributes in the phishing knowledgebase.

In some aspects, the present disclosure is directed to a method of conducting an electronic-message phishing game having at least one gaming feature, the method being performed by a computing system and comprising: receiving, from one or more users, a plurality of suspected phishing messages that the one or more users received via an electronic messaging system; processing each of the plurality of suspected phishing messages with one or more gamification algorithms so as to determine gamification data for the plurality of suspected phishing messages; and providing the gamification data to one or more game algorithms of the electronic-message phishing game, wherein the one or more game algorithms provide the at least one gaming feature.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of identifying and reporting original reports of electronic phishing messages reported by a plurality of users each having a corresponding electronic-message inbox, wherein each electronic-message inbox stores metadata for each message that the user inbox receives, the method being performed automatically by a computing system, the method comprising:
    receiving suspected phishing electronic messages forwarded by the users from the corresponding electronic-message inboxes;
    for each of the suspected phishing electronic messages:
        electronically collecting phishing-analysis data from the suspected phishing electronic message;
        executing a phishing-analysis computer algorithm that operates on the phishing-analysis data and on an electronic phishing knowledgebase to determine whether or not the suspected phishing electronic message is an electronic phishing message;
        electronically collecting message-identifying data from the suspected phishing electronic message for uniquely identifying the suspected phishing electronic message;
        using the message-identifying data, electronically retrieving metadata for the suspected phishing electronic message from the electronic-message inbox of the user that forwarded the suspected phishing electronic message;
        executing a reporting-analysis computer algorithm that operates on the message-identifying data and the metadata to determine whether or not the forwarding of the suspected phishing electronic message is an original reporting; and
    when the phishing-analysis computer algorithm determines that the suspected phishing electronic message is an electronic phishing message and the reporting-analysis computer algorithm determines that the reporting of the suspected phishing electronic message is an original reporting, electronically reporting the suspected phishing electronic message to a phishing agent as an original reporting:
    wherein each suspected phishing electronic message includes at least one user-annotation identifying one or more indicia that the suspected phishing electronic message is a phishing electronic message, and the method further comprises for each of the suspected phishing electronic messages:
        electronically retrieving the at least one user-annotation from the suspected phishing electronic message; and
        executing an assessment and scoring computer algorithm that operates on the retrieved at least one user-annotation to determine correctness of the at least one user-annotation and assign an assessment value based on the correctness;
    wherein the electronic reporting to the phishing agent includes reporting to the point-tallying system a point value that includes the assessment value.

2. The method of claim 1, wherein the phishing agent includes point-tallying system, and the method further comprises for each of the suspected phishing electronic messages:
    electronically determining a reporting time using the message-identifying data and or metadata; and
    automatically assigning a reporting-time value to the reporting time based on quickness of the user reporting the suspected phishing electronic message;
    wherein the electronic reporting to the phishing agent includes reporting to the point-tallying system a point value that includes the reporting-time value.

3. The method of claim 1, wherein:
    the phishing agent includes point-tallying system, and the method further comprises for each of the suspected phishing electronic messages:
        electronically determining a reporting time using the message-identifying data and/or metadata; and
        automatically assigning a reporting-time value to the reporting time based on quickness of the user reporting the suspected phishing electronic message;
        wherein the electronic reporting to the phishing agent includes reporting to the point-tallying system a point value that includes the reporting-time value; and
    the suspected phishing electronic message includes at least one user-annotation identifying one or more indicia that the suspected phishing electronic message is a phishing electronic message, and the method further comprises for each of the suspected phishing electronic messages:
        electronically retrieving the at least one user-annotation from the suspected phishing electronic message; and
        executing an assessment and scoring computer algorithm that operates on the retrieved at least one user-annotation to determine correctness of the at least one user-annotation and assign an assessment value based on the correctness; and
        wherein the electronic reporting to the phishing agent includes reporting to the point-tallying system a point value that includes the assessment value.

4. The method of claim 1, wherein the electronic phishing messages include actual electronic phishing messages.

5. The method of claim 1, wherein the electronic phishing messages include simulated electronic phishing messages.

6. The method of claim 1, wherein the electronic phishing messages include actual electronic phishing messages and simulated electronic phishing messages.

7. The method of claim 1, wherein the electronic knowledgebase includes a database of known phishing campaigns.

8. The method of claim 1, wherein the electronic knowledgebase includes known phishing intelligence feeds.

9. The method of claim 1, further comprising, when unable to automatically determine that the suspected phishing electronic message is an electronic phishing message, sending a phishing report to an analyst for review and characterization.

10. The method of claim 1, wherein:
each electronic phishing message is a phishing email message;
each electronic-message inbox is an email inbox;
each suspected phishing electronic message is a suspected phishing email message; and
each electronic message is an email message.

11. A computer-readable storage medium containing machine-executable instructions for performing a method of identifying and reporting original reports of electronic phishing messages reported by a plurality of users each having a corresponding electronic-message inbox, wherein each electronic-message inbox stores metadata for each message that the user inbox receives, the method comprising:
receiving suspected phishing electronic messages forwarded by the users from the corresponding electronic-message inboxes;
for each of the suspected phishing electronic messages:
electronically collecting phishing-analysis data from the suspected phishing electronic message;
executing a phishing-analysis computer algorithm that operates on the phishing-analysis data and on an electronic phishing knowledgebase to determine whether or not the suspected phishing electronic message is an electronic phishing message;
electronically collecting message-identifying data from the suspected phishing electronic message for uniquely identifying the suspected phishing electronic message;
using the message-identifying data, electronically retrieving metadata for the suspected phishing electronic message from the electronic-message inbox of the user that forwarded the suspected phishing electronic message;
executing a reporting-analysis computer algorithm that operates on the message-identifying data and the metadata to determine whether or not the forwarding of the suspected phishing electronic message is an original reporting; and
when the phishing-analysis computer algorithm determines that the suspected phishing electronic message is an electronic phishing message and the reporting-analysis computer algorithm determines that the reporting of the suspected phishing electronic message is an original reporting, electronically reporting the suspected phishing electronic message to a phishing agent as an original reporting:
wherein each suspected phishing electronic message includes at least one user-annotation identifying one or more indicia that the suspected phishing electronic message is a phishing electronic message, and the method further comprises for each of the suspected phishing electronic messages:
electronically retrieving the at least one user-annotation from the suspected phishing electronic message; and
executing an assessment and scoring computer algorithm that operates on the retrieved at least one user-annotation to determine correctness of the at least one user-annotation and assign an assessment value based on the correctness;
wherein the electronic reporting to the phishing agent includes reporting to the point-tallying system a point value that includes the assessment value.

12. The computer-readable storage medium of claim 11, wherein the phishing agent includes point-tallying system, and the method further comprises for each of the suspected phishing electronic messages:
electronically determining a reporting time using the message-identifying data and or metadata; and
automatically assigning a reporting-time value to the reporting time based on quickness of the user reporting the suspected phishing electronic message;
wherein the electronic reporting to the phishing agent includes reporting to the point-tallying system a point value that includes the reporting-time value.

13. The computer-readable storage medium of claim 11, wherein:
the phishing agent includes point-tallying system, and the method further comprises for each of the suspected phishing electronic messages:
electronically determining a reporting time using the message-identifying data and or metadata; and
automatically assigning a reporting-time value to the reporting time based on quickness of the user reporting the suspected phishing electronic message;
wherein the electronic reporting to the phishing agent includes reporting to the point-tallying system a point value that includes the reporting-time value; and
the suspected phishing electronic message includes at least one user-annotation identifying one or more indicia that the suspected phishing electronic message is a phishing electronic message, and the method further comprises for each of the suspected phishing electronic messages:
electronically retrieving the at least one user-annotation from the suspected phishing electronic message; and
executing an assessment and scoring computer algorithm that operates on the retrieved at least one user-annotation to determine correctness of the at least one user-annotation and assign an assessment value based on the correctness; and
wherein the electronic reporting to the phishing agent includes reporting to the point-tallying system a point value that includes the assessment value.

14. The computer-readable storage medium of claim 11, wherein the electronic phishing messages include actual electronic phishing messages.

15. The computer-readable storage medium of claim 11, wherein the electronic phishing messages include simulated electronic phishing messages.

16. The computer-readable storage medium of claim 11, wherein the electronic phishing messages include actual electronic phishing messages and simulated electronic phishing messages.

17. The computer-readable storage medium of claim 11, wherein the electronic knowledgebase includes a database of known phishing campaigns.

18. The computer-readable storage medium of claim 11, wherein the electronic knowledgebase includes known phishing intelligence feeds.

19. The computer-readable storage medium of claim 11, further comprising, when unable to automatically determine that the suspected phishing electronic message is an electronic phishing message, sending a phishing report to an analyst for review and characterization.

20. The computer-readable storage medium of claim 11, wherein:
each electronic phishing message is a phishing email message;

each electronic-message inbox is an email inbox;
each suspected phishing electronic message is a suspected phishing email message; and
each electronic message is an email message.

\* \* \* \* \*